United States Patent [19]
Andreotti

[11] 3,826,373
[45] July 30, 1974

[54] LIQUID CHROMATOGRAPHY APPARATUS
[75] Inventor: Raymond E. Andreotti, Hopedale, Mass.
[73] Assignee: The United States of America as represented by the Secretary of the Army, Washington, D.C.
[22] Filed: Apr. 3, 1973
[21] Appl. No.: 347,601

[52] U.S. Cl.............................................. 210/198 C
[51] Int. Cl............................................ B01d 15/08
[58] Field of Search...................... 210/31 C, 198 C

[56] References Cited
UNITED STATES PATENTS
| | | | |
|---|---|---|---|
| 3,346,486 | 10/1967 | Winter et al. | 210/198 C |
| 3,446,057 | 5/1969 | Bakalyaa et al. | 210/31 C |
| 3,510,271 | 5/1970 | Emneus et al. | 210/198 C |
| 3,732,982 | 5/1973 | Donnill et al. | 210/198 C |

*Primary Examiner*—John Adee
*Attorney, Agent, or Firm*—Edward J. Kelly; Herbert Berl; Charles C. Rainey

[57] ABSTRACT

A liquid chromatography apparatus comprising a liquid sample measuring and feeding device adapted for use in feeding a liquid sample of a measured volume to a chromatographic fractionating column, the device comprising a syringe-like means for measuring the sample, and a pair of four-way valves for controlling the flow of the sample to the syringe-like measuring means and from the measuring means to the chromatographic fractionating column and for controlling the flow of the mobile liquid phase employed in driving the sample to and through the chromatographic fractionating column.

5 Claims, 3 Drawing Figures

PATENTED JUL 30 1974 3,826,373

LIQUID CHROMATOGRAPHY APPARATUS

The invention described herein may be manufactured, used, and licensed by or for the Government for governmental purposes without the payment to me of any royalty thereon.

BACKGROUND OF THE INVENTION

This invention relates to a liquid chromatography apparatus comprising a liquid sample measuring and feeding device for use in measuring and feeding a liquid sample of a selected volume to a chromatographic fractionating column in which the liquid sample is fractionated into components of differing molecular structures or molecular weights or both.

In the practice of liquid chromatography it has been customary to feed a measured sample of a liquid containing a mixture of components needing to be separated to the top of a fractionation column of gel particles, or in some cases other types of particles, which more or less retard the flow of different components through the column of particles under the motive influence of a mobile liquid phase, such as a buffer solution or the like. Coils of calibrated micro bore tubing have been used for measuring the volumes of liquid samples for this purpose. Such a coil containing the liquid sample has been inserted into the line through which the mobile liquid phase flows to the top of the fractionation column and the sample is conducted into and through the fractionation column under the motive influence of the mobile liquid phase. Alternatively, the top of the fractionation column may be opened; a portion of the mobile liquid phase may be removed from above the column of gel particles; and the liquid sample may be injected onto the top of the gel column. After the sample has entered the gel by gravity, the top of the gel column is washed with two to three small volumes of mobile liquid phase, each being allowed to sink into the gel. These washings are to assure that all the sample that may be clinging to the walls of the column on top of the gel is allowed to enter the gel. Then the mobile liquid phase is reconnected to the top of the column to force the liquid sample down through the gel column. A distinct disadvantage of this mode of introducing the liquid sample to the gel column is that considerable intermixing of the sample with the mobile liquid phase occurs before actual fractionating of the liquid sample begins on the gel column, such intermixing causing the separation bands to be fuzzy or to result in "tailing." Such tailing can be reduced somewhat by slowing down the rate of flow of the mobile liquid phase and, therefore, of the liquid sample through the gel column. However, in preparative chromatography in which samples of considerable size may often be required, it is distinctly disadvantageous to have to slow down the movement of the mobile phase and the sample through the column, yet it is important to obtain good separation of the sample into its several component fractions. Also, in preparative chromatography it is impractical to use micro bore tubing for measuring the samples since large volumes are required and the coils of micro bore tubing required become exceedingly long and cumbersome to work with.

It is therefore, an object of the present invention to provide a device for use in connection with a liquid chromatography apparatus which will enable the measuring of liquid samples of substantial volumes and the feeding thereof to a fractionation column without appreciable intermixing with a mobile liquid phase prior to contact of the liquid sample with the fractionation column and without the necessity of opening the chromatographic fractionating column to the atmosphere during the introduction of successive measured volumes of a given liquid sample to the column.

Other objects and advantages will be apparent from the following description of one embodiment of the invention, and the novel features will be particularly pointed out hereinafter in connection with the appended claims.

SUMMARY

The objects of the invention are accomplished by providing a liquid measuring and feeding device for use in feeding a liquid sample of a selected volume to a chromatographic fractionating column for separating such a liquid sample into components of differing structures and molecular weights without any substantial intermixing of the liquid sample with the mobile liquid phase or components of the fractionating column prior to the start of fractionation. The liquid measuring and feeding device comprises means for measuring a volume of liquid sample which comprises a graduated substantially cylindrical syringe-like vessel, a movable plunger which fits snugly in the syringe-like vessel, an inlet tube connected to the top of the movable plunger and in turn to a passageway which passes through the plunger from top to bottom thereof and into the interior of the syringe-like vessel, and an exit tube connected to the bottom of the syringe-like vessel, a first multi-way valve connected at one port thereof to the inlet tube and a second multi-way valve connected at one port thereof to the exit tube, the first multi-way valve also being connected by a conduit to means for drawing a liquid sample into the measuring means through the second multi-way valve and the exit tube and by a conduit to means for forcing the mobile liquid phase through the measuring means when the measuring means is filled with liquid sample, the second multi-way valve also being connected by a conduit to means for supplying liquid sample to the measuring means through the exit tube and by a conduit for conducting the mobile liquid phase alone or the liquid sample and the mobile liquid phase to the top of the fractionating column. The first and second multi-way valves are interconnectable through a by-pass conduit for by-passing the mobile liquid phase around the measuring means and to the fractionating column when the measuring means is being filled with liquid sample. Thus the fractionating column is being flushed with mobile liquid phase in a closed system while the measuring means is being filled with liquid sample in a definite volume; and then by rotation of each of the two multi-way valves and without opening the system to the atmosphere, the mobile liquid phase forces the liquid sample in a measured volume out of the measuring means into the top of the fractionating column and through the fractionating column with a minimum of intermixing of the liquid sample with the mobile liquid phase. The rate of flow of the mobile liquid phase may be controlled so as to cause the fractionation of the liquid sample to be carried out as expeditiously as possible for a given system while minimizing tailing of the fractions. The system is adaptable to the measuring and fractionation of relatively large volumes of sample, as in preparative chromatography.

DESCRIPTION OF THE PREFERRED EMBODIMENT

Figure 1:
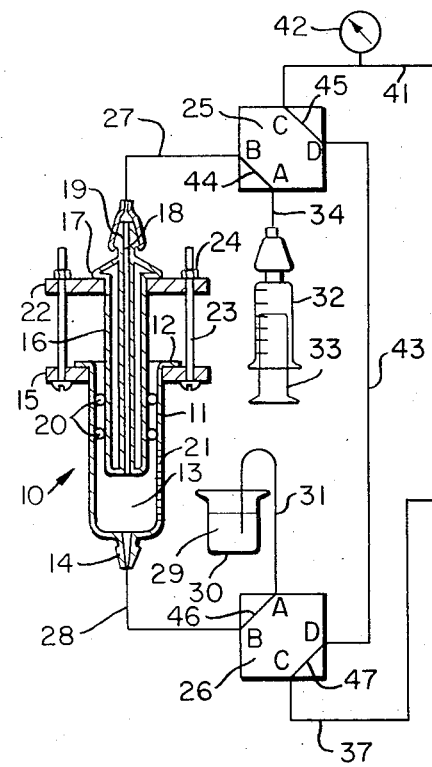
FIG. 1 represents schematically the liquid measuring and feeding device of the invention in combination with a pumping means for pumping a mobile liquid phase through the system and a chromatographic fractionating column, the system being shown during measuring of the liquid sample.

The preferred embodiment of the invention is shown in the drawings and involves a syringe-like volume measuring portion which is employed in cooperation with two four-way valves which, in combination with conduits, control the flow of liquid sample and a mobile liquid phase to the measuring portion and from the measuring portion to the chromatographic fractionating column.

Referring to the drawing, reference numeral 10 represents the liquid measuring portion of the device. It comprises a substantially cylindrical syringe-like vessel 11 which is graduated along its sidewall in terms of milliliters or other suitable units of volume for the particular liquid to be fractionated by liquid chromatography. Vessel 11 has a flanged top edge 12, an inner bore 13, and an exit nozzle 14. The top edge 12 is supported by lower bracket 15 which may be fastened and supported in any convenient manner. Movable plunger 16, which has a flanged upper portion 17, has a hollow central passageway 18 leading from inlet nozzle 19 at the top of the movable plunger to the bottom thereof and connecting with the interior of vessel 11. The movable plunger 16 fits snugly inside of a pair of resilient liquid-tight rings 20 which may be made of synthetic rubber and are maintained in place by being fitted into shallow grooves in the outer surface of plunger 16. The outer surfaces of the rings 20 which contact vessel 11 may be lubricated with a silicone to facilitate movement of the plunger while still maintaining a liquid-tight seal at any volume setting within the limits of the liquid measuring portion. Movement of the movable plunger 16 upward produces an increase in the volume of liquid sample held within the liquid measuring portion while movement of the plunger downward results in a decrease in the volume of liquid sample. The sidewalls of the vessel may be marked with graduations 21 showing the volume in milliliters or other suitable units according to the location of the bottom edge of movable plunger 16 with respect to the graduations. Upper bracket 22 supports the flanged upper portion 17 of plunger 16. It is movable upward or downward on threaded bolts 23 which mate with threaded nuts 24. Thus it is possible to position plunger 16 accurately and to maintain a given volume setting for as long as is desired. It is preferred that vessel 11 be constructed of a transparent material, e.g. glass, so that the bottom edge of movable plunger 16 may be easily lined up with the volume graduations 21 on the sidewall of vessel 11.

The liquid measuring portion 10 of the device is connected by way of four-way valves 25 and 26 and conduits 27 and 28 to other elements of the apparatus, including the source of the sample, means for drawing the sample into the measuring portion, the chromatographic column to which the measured sample is to be fed and upon which the separation of the components of the sample is to be accomplished, the source of a mobile liquid phase including means for pumping the mobile liquid phase through the apparatus, and a pressure gauge for the mobile liquid phase, as well as conduits for conducting the liquid sample and the liquid mobile phase between the above-mentioned elements of the apparatus. Referring to FIG. 1, the liquid sample 29 is contained in sample reservoir 30 and is conducted via conduit 31 to or from four-way valve 26. A syringe-like member 32 having a plunger 33 is provided for applying suction through conduit 34 and by way of four-way valve 25 and conduit 27 to liquid measuring portion 10 and thence via conduit 28, four-way valve 26, and conduit 31 to the liquid sample 29, whereby a portion of the liquid sample may be drawn into the liquid measuring portion of the device in order to provide a measured volume of the liquid sample to be fed into chromatographic fractionating column 35, contained within column tube 36, at the appropriate time, the measured volume of liquid sample being conducted to the top of the chromatographic fractionating column from four-way valve 26 via conduit 37. A reservoir 38 for a liquid mobile phase 39 and a pump 40 are provided for use in motivating the measured volume of liquid sample through the chromatographic fractionating column and in flushing the chromatographic fractionating column prior to introduction of the liquid sample to the top of the column. The liquid mobile phase 39 is conducted from reservoir 38 through conduit 41 to four-way valve 25. Pressure gauge 42 is provided for measuring the pressure under which the liquid mobile phase is being forced through conduit 41. A conduit 43 is provided between four-way valve 25 and four-way valve 26 for the purpose of by-passing the liquid mobile phase around the measuring portion of the device and for enabling flushing of the chromatographic fractionating column with liquid mobile phase while the liquid sample is being measured in the measuring portion preparatory to being fed to the chromatographic fractionating column.

Figure 2:
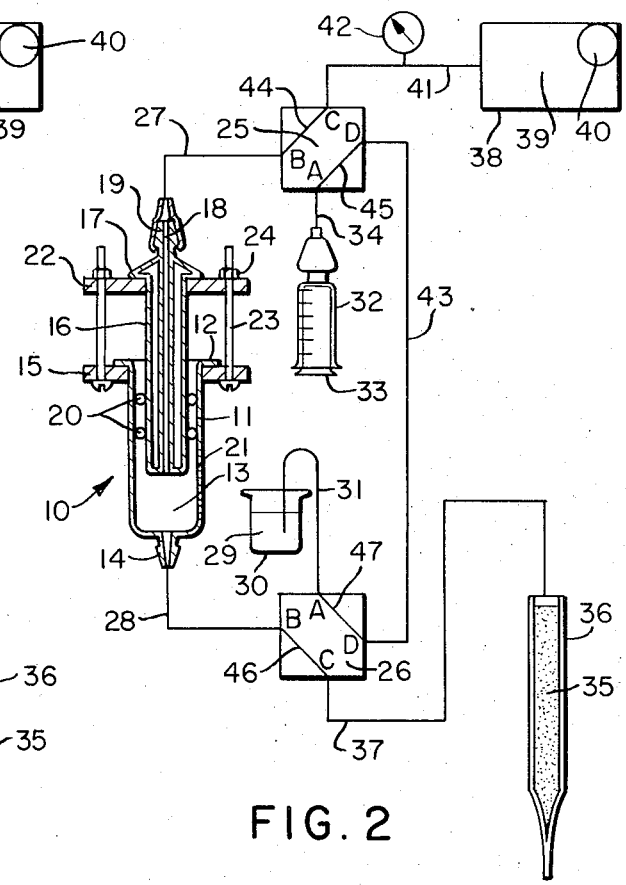
FIG. 2 is similar to FIG. 1 except that the system is shown during the feeding of the measured volume of liquid sample to the fractionating column under the motive influence of the mobile liquid phase on a measured quantity of the liquid sample.
Figure 3:
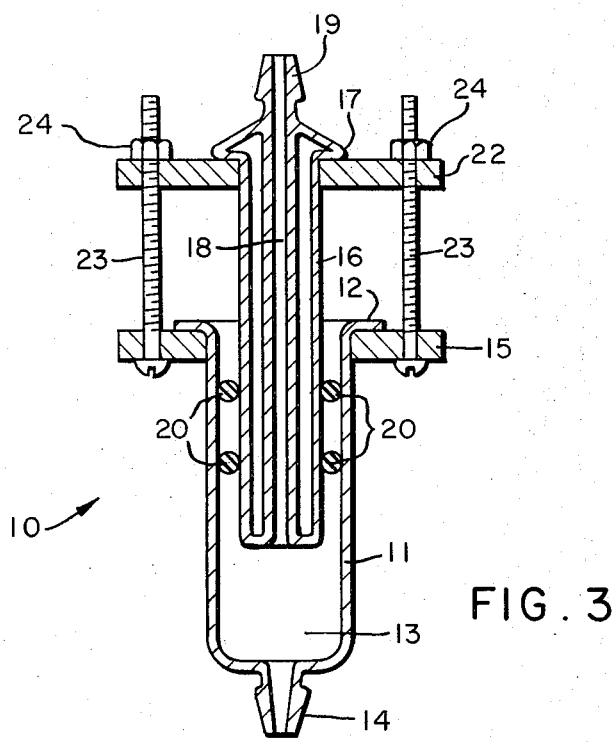
FIG. 3 is an enlarged vertical cross-section of the liquid measuring portion of the device of the invention.

Each of the four-way valves 25 and 26 has four ports which are represented in FIGS. 1 and 2 by A, B, C, and D. Valve 25 has passageways 44 and 45 passing therethrough so that when four-way valve 25 is oriented as in FIG. 1, passageway 44 connects ports 25A and 25B and passageway 45 connects ports 25C and 25D. Similarly, valve 26 has passageways 46 and 47 passing therethrough so that when four-way valve 26 is oriented as in FIG. 1, passageway 46 connects ports 26A and 26B and passageway 47 connects ports 26C and 26D. However, when four-way valve 25 is rotated clockwise and four-way valve 26 is rotated counterclockwise, the passageways 44, 45, 46, and 47 are oriented as shown in FIG. 2, passageway 44 connecting ports 25B and 25C, passageway 45 connecting ports 25A and 25D, passageway 46 connecting ports 26B and 26C, and passageway 47 connecting ports 26A and 26D.

OPERATION OF THE APPARATUS

As pointed out above, FIG. 1 represents the arrangement of apparatus during the measuring of the liquid sample preparatory to fractionation on the chromatographic fractionating column, while FIG. 2 represents the arrangement of the apparatus during the fractionation of the measured volume of liquid sample on the chromatographic fractionating column.

The dimensions of the various elements or portions of the apparatus will depend considerably on the quantity of sample to be fractionated. In general, for small volumes, i.e. up to about 5 milliliters, one can operate conveniently with coiled micro bore Teflon tubing for measuring the liquid sample and feeding it to the chromatographic fractionating column. Above this quantity of sample, the present apparatus works quite well and is particularly useful in preparative liquid chromatography where relatively large volumes of sample may need to be fractionated, as for example in the separation of amino-acid breakdown products from proteins or other sources. In such cases the liquid measuring portion 10 is much more convenient to operate with than extremely long coils of micro bore tubing. Generally speaking, the conduits 27, 28, 31, 34, 37, 41, and 43 will be micro bore tubing, usually made of Teflon.

A liquid sample 29 which is to be fractionated is loaded into sample reservoir 30. A gel-type chromatographic fractionating column 35 is prepared and loaded into column tube 36. Numerous different materials may be used for this purpose as is well-known in the art of liquid chromatography. Quite often gels of one kind or another are used. Such gels as dextran or modified dextran, such as the "Sephadex" gels, are being used more and more for this purpose. However, the apparatus of the invention is not limited to use with any particular type of chromatographic fractionating column. Consequently, the nature of column 35 and of column tube 36 is of no great moment in connection with the apparatus of the invention.

To provide motive power for moving the liquid sample through the apparatus after it has been measured in a preselected volume, a liquid mobile phase 39 is loaded into reservoir 38. The liquid mobile phase may be a buffer solution or other type of solution depending on the nature of the sample. It should be of a lesser density than the density of the sample to reduce the possibilities of mixing with the sample as the measured sample is forced out of the measuring portion of the device into the chromatographic fractionating column. In order to produce a sufficient differential in density between the sample and the mobile liquid phase, quite often sucrose is added to the sample solution to increase its density.

With the four-way valves 25 and 26 set as shown in FIG. 1, the pump 40 is started so that the chromatographic fractionating column 35 will be flushed with the mobile liquid phase 39. The liquid measuring portion of the device is set for the volume of sample to be fractionated by adjusting the position of movable plunger 16 so as to provide the desired volume between port 25A and port 26A, including the conduits 27 and 28, passageway 44 and 46, central passageway 18, the inner bore 13 of vessel 11 and the interiors of inlet nozzle 19 and exit nozzle 14. Plunger 33 of syringe-like member 32 is drawn downwardly creating suction so that the liquid sample is drawn into the measuring portion and therethrough until some of the liquid sample enters syringe-like member 32. Then four-way valve 25 is turned clockwise and four-way valve 26 is turned counterclockwise, this being done practically simultaneously, to the orientations of the valves shown in FIG. 2 so that, with the pump 40 running, the flow of the measured liquid sample to the chromatographic fractionating column through conduit 37 begins under the motivation of the liquid mobile phase 39. While the measured liquid sample is thus being forced to and through the chromatographic fractionating column, the liquid sample drawn into the syringe-like member 32 may be returned to the sample reservoir 30 by forcing plunger 33 upward to the end of its stroke. It is then ready to draw another sample into the measuring portion when the first measured sample has been fractionated and the fractions have been removed from the fractionating column. To accomplish this, valve 25 is rotated counterclockwise and valve 26 is rotated clockwise so that each resumes the orientation shown in FIG. 1. The liquid mobile phase may be kept flowing and the previously described steps repeated as many times as desired.

Although the invention has been described in terms of its use in connection with gel permeation chromatography, it is to be understood that it may also be used in connection with any type of liquid chromatography which employs a column of particles for selective retardation of one component as compared with another or other components of a liquid which is being fractionated. For example, the invention may be used in connection with adsorption chromatography, ion-exchange chromatography, or exclusion chromatography. The invention may also be used in connection with liquid-liquid partition chromatography.

An outstanding advantage of the invention is the fact that it makes possible the feeding of sample after sample to a chromatographic fractionating column without opening the column to the atmosphere or stopping flow through the column other than momentarily while the valves are being turned. Another advantage lies in the comparatively large volumes of sample that may be accurately measured and processed through the fractionating apparatus. Also advantageous is the reduction in tailing of the fractions since mixing of the liquid mobile phase with the sample prior to fractionation thereof is practically eliminated. A further advantage over prior means for carrying out chromatographic fractionations is that any bubbles which may be formed in the liquid mobile phase, for example in a buffer solution, will generally be trapped in the measuring portion and thus be prevented from getting to the chromatographic column of gel particles or whatever. This tends to prolong the useful life of a given chromatographic column, thus saving time and reducing the costs of chromatographic fractionations.

It will be understood that various changes in the details, materials and arrangements of parts, which have been herein described and illustrated in order to explain the nature of the invention, may be made by those skilled in the art, within the principle and scope of the invention as expressed in the appended claims.

I claim:

1. In a liquid chromatography apparatus which comprises a chromatographic fractionating column, means for feeding a liquid sample to said chromatographic fractionating column, and a mobile liquid phase circulating means, the improvement which comprises a liquid sample measuring and feeding device for measuring and feeding a liquid sample of a preselected volume to said chromatographic fractionating column comprising, adjustable means for measuring a volume of liquid sample; a source of liquid sample; means for drawing a portion of said liquid sample into said adjustable measuring means; and a pair of multi-way valve means for cooperatively controlling flow of said liquid sample from said liquid sample source to said measuring means, by-passing of a mobile liquid phase around said measuring means to said chromatographic fractionating column, flow of said liquid mobile phase to said measuring means, flow of said liquid sample from said measuring means to said chromatographic fractionating column under the influence of said mobile liquid phase, and flow of any excess of liquid sample from said drawing means back to said source of liquid sample, a first one of said pair of multi-way valves being located between said mobile liquid phase circulating means and said measuring means and between said drawing means and said measuring means, and a second one of said pair of multi-way valves being located between said measuring means and said chromatographic fractionating column and between said liquid sample source and said measuring means; whereby a plurality of liquid samples of measured volume may be successively passed through said chromatographic fractionating column without exposing said chromatographic column to the atmosphere.

2. Liquid chromatography apparatus according to claim 1, wherein said first and second multi-way valves are four-way valves.

3. Liquid chromatography apparatus according to claim 1, wherein said chromatographic fractionating column is a gel-type column.

4. Liquid chromatography apparatus according to claim 1, wherein said drawing means is a syringe-like member.

5. Liquid chromatography apparatus according to claim 1, wherein said adjustable measuring means is a syringe-like member comprising a plunger element having a hollow passageway passing therethrough from top to bottom, said hollow passageway being adapted for passage of said liquid sample and said mobile liquid phase into the interior of said measuring means.

* * * * *